United States Patent Office 3,246,037
Patented Apr. 12, 1966

1

3,246,037
5,10-SECO-5,19-CYCLO-10-FLUORO-STEROIDS
Lawrence H. Knox, Mexico City, Mexico, assignor to Syntex Corporation, Panama, Panama, a corporation of Panama
No Drawing. Filed June 11, 1963, Ser. No. 286,914
Claims priority, application Mexico, Aug. 28, 1962, 68,729
The portion of the term of the patent subsequent to May 18, 1982, has been disclaimed
24 Claims. (Cl. 260—586)

This invention relates to novel cyclopentanophenanthrene derivatives and to processes for their preparation.

More particularly, this invention relates to novel 5,10-seco-5,19-cyclo-10-fluoro-steroids of the androstane and pregnane series represented by the general formulas:

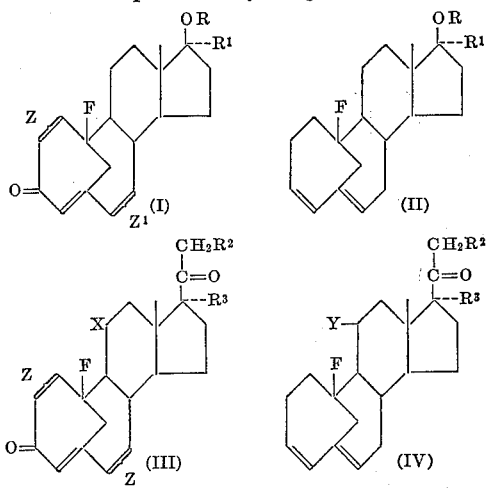

wherein R represents hydrogen or an acyl group containing less than 12 carbon atoms; $R^1$ represents hydrogen or a lower alkyl, e.g., methyl, ethyl, propyl and the like, lower alkenyl, e.g., vinyl and the like, or lower alkinyl, e.g., ethinyl and the like, group containing 1 to 6 carbon atoms, inclusive; $R^2$ and $R^3$ each represent hydrogen, hydroxyl or an acyloxy group containing less than 12 carbon atoms, Y represents hydrogen, β-hydroxyl or a keto group, with Y being hydrogen when $R^3$ is hydrogen, Z represents a single bond or a double bond between C–1 and C–2, and $Z^1$ represents a single bond or a double bond between C–6 and C–7 with at least one of Z and $Z^1$ being a double bond.

The novel 5,10-seco-5,19-cyclo-10-fluoro-pregnadienes and pregnatrienes represented by Formulas III and IV above can also be represented by the following more specific formulas:

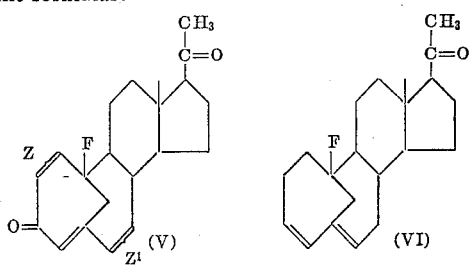

2

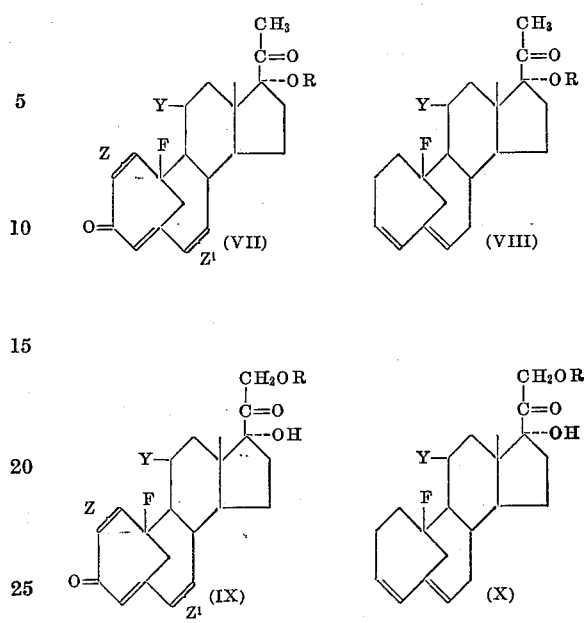

In these formulas R, Y, Z and $Z^1$ have the same meanings as set forth hereinabove.

The acyl and acyloxy groups referred to above are derived from hydrocarbon carboxylic acids containing less than 12 carbon atoms. These acids may be saturated or unsaturated, of straight, branched, cyclic or cyclic-aliphatic chain or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by Formulas I and II are anabolic agents having a favorable anabolic-androgenic ratio. They also possess antiestrogenic activity and inhibit the deposition of calcium in bones.

The compounds represented by Formulas V–VIII, inclusive, are progestational agents with anti-estrogenic activity. In addition, they inhibit ovulation and also show certain diuretic activity. Thus, they are useful in the maintenance of pregnancy and in fertility control.

The compounds represented by Formulas IX and X inhibit the production of ACTH by the pituitary gland. They also possess anti-inflammatory activity, especially the topical applications.

In my copending U.S. patent application Serial No. 286,931, filed on June 11, 1963, now U.S. Patent No. 3,184,484, I describe the preparation of 5,10-seco-5,19-cyclo-10β-fluoro-Δ⁴-3-keto steroids of the androstane and pregnane series by reaction of a Δ⁴-3-keto-9-hydroxy-androstane or pregnane with an α-fluorinated amine.

The 5,10-seco-5,19-cyclo-10β-fluoro-androstane derivatives of the present invention are obtained in accordance with the following sequence of reactions:

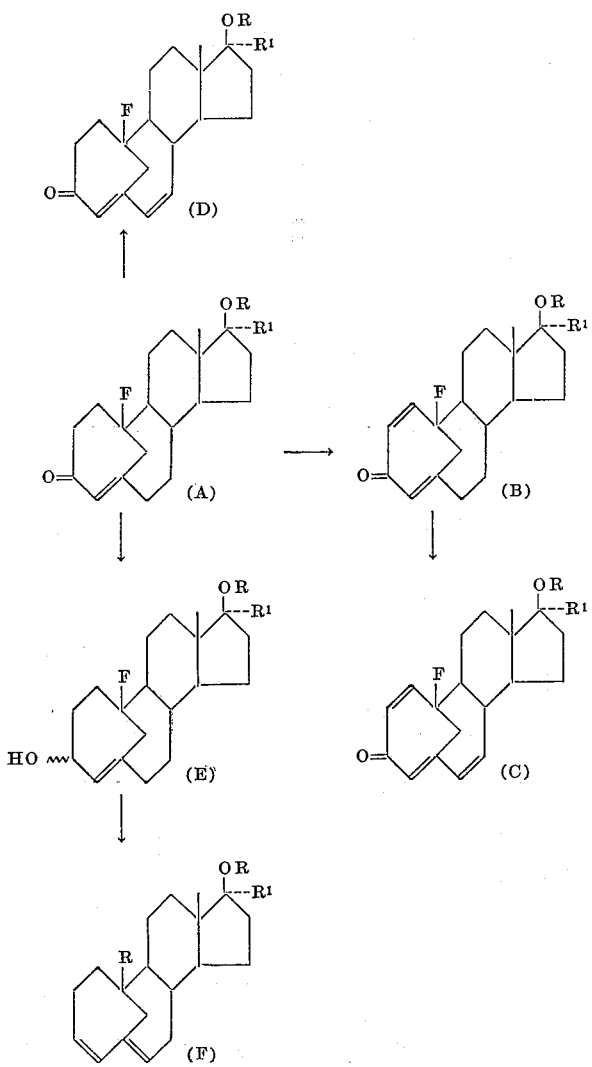

In the above formulas R and R¹ have the same meanings as set forth hereinabove.

In carrying out the reaction sequences outlined above, the starting materials, 5,10-seco-5,19-cyclo-10β-fluoro-Δ⁴-androsten-17β-ol, the 17α-alkyl, -alkenyl and -alkinyl derivatives or the esters thereof (A) obtained as described in my above-mentioned copending U.S. patent application, are refluxed with selenium dioxide in t-butanol solution in the presence of a catalytic amount of pyridine, or with 2,3-dichloro-5,6-dicyano-1,4-benzoquinone for a period of time in the order of 8 to 16 hours, to produce 5,10-seco-5,19-cyclo-10β-fluoro-Δ¹,⁴-androstadien-17β-ol - 3 - one, or the corresponding 17α-substituted derivatives (B).

These Δ¹,⁴-dienes, upon a second dehydrogenation with chloranil in t-butanol, or with 2,3-dichloro-5,6-dicyano-1,4-benzoquinone, at reflux temperature for a period of time of between 8 and 12 hours, give rise to the corresponding Δ¹,⁴,⁶-trienes (C).

When the reaction with chloranil is effected prior to dehydrogenation with selenium dioxide or 2,3-dichloro-5,6-dicyano-1,4-benzoquinone, the corresponding Δ⁴,⁶-dienes are obtained.

By reduction of 5,10-seco-5,19-cyclo-10β-fluoro-Δ⁴-androsten-17β-ol-3-one or the corresponding 17α-substituted derivatives (A, R=H), preferably using lithium aluminum hydride in tetrahydrofuran solution, at reflux temperature, the corresponding 3,17-diols (E) are produced. These 3,17-diols are then dehydrated by reaction with aqueous acetic acid, preferably with 50% acetic acid, at a temperature between 75 to 100° C., for a period of time of 1 to 4 hours, to produce 5,10-seco-5,19-cyclo-10β-fluoro-Δ³,⁵-androstadien-17β-ol as well as the 17α-alkyl, -alkenyl and -alkinyl derivatives thereof (F, R=H).

Conventional esterification of the 17β-hydroxy compounds (B, C, D and F, R=H), e.g., with acid anhydrides or chlorides containing less than 12 carbon atoms in pyridine solution, in the case of the 17α-unsubstituted compounds, or with the acid anhydrides in benzene solution in the presence of p-toluenesulfonic acid in the case of the 17α-alkyl, -alkenyl and -alkinyl substituted compounds, results in the respective esters (B, C, D and F, R=acyl).

My novel 5,10-seco-5,19-cyclo-10β-fluoro derivatives of the pregnane series are obtained by the process illustrated in part by the following sequence of reactions:

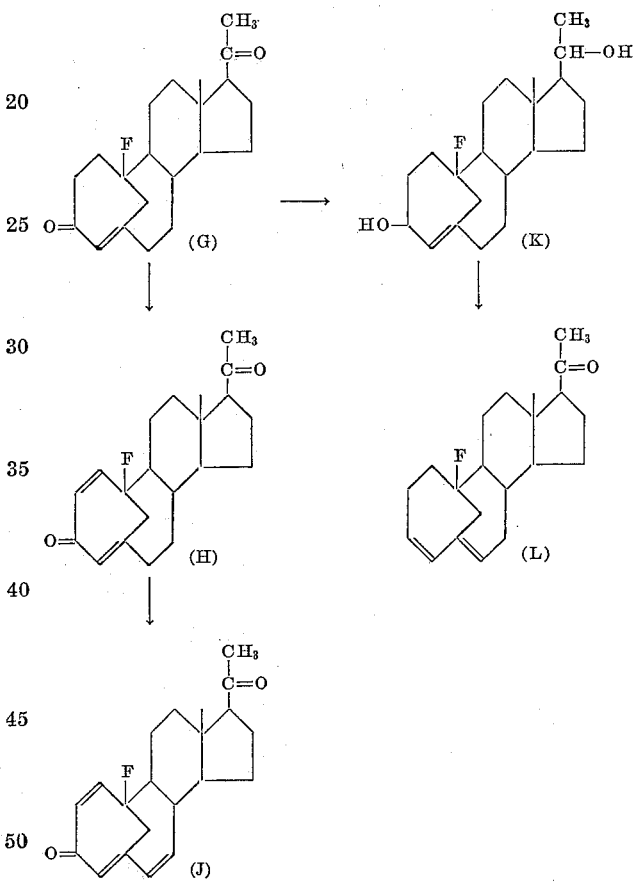

The methods employed are essentially the same as those described above for the preparation of the 5,10-seco-5,19-cyclo-10β-fluoro-androstanes of the present invention.

Thus, by selenium dioxide or 2,3-dichloro-5,6-dicyano-1,4-benzoquinone dehydrogenation of 5,10-seco-5,19-cyclo-10β-fluoro-Δ⁴-pregnene-3,20-dione (G) obtained as described in my aforementioned copending U.S. patent application, there is produced 5,10-seco-5,19-cyclo-10β-fluoro-Δ¹,⁴-pregnadiene-3,20-dione (H), which in turn by reaction with chloranil, gives rise to 5,10-seco-5,19-cyclo-10β-fluoro-Δ¹,⁴,⁶-pregnatriene-3,20-dione (J).

By reduction of 5,10-seco-5,19-cyclo-10β-fluoro-Δ⁴-pregnene-3,20-dione (G) with lithium aluminum hydride in tetrahydrofuran solution there is produced 5,10-seco-5,19-cyclo-10β-fluoro-Δ⁴-pregnene-3β,20β-diol (K) which is dehydrated with aqueous acetic acid and reoxidized at the 20-position, preferably using 8 N chromic acid in acetone solution, thus affording 5,10-seco-5,19-cyclo-10β-fluoro-Δ³,⁵-pregnadien-20-one (L).

In order to obtain the 5,10-seco-5,19-cyclo-10β-fluoro-17,21-dihydroxy derivatives of the pregnane series, which may also possess an oxygenated function at the 11-position, I follow the same sequence of reaction steps indicated above, but use as starting materials the 21-monoesters of 5,10-seco-5,19-cyclo-10β-fluoro-Δ⁴-pregnene-17α, 21-diol-3,20-dione or the 21-monoesters of the corresponding 11-keto and 11-hydroxy compounds. Alternatively, 17,20;20,21-bismethylenedioxy-5,10-seco-5,19-cyclo - 10β-fluoro-Δ⁴-pregnen-3-one and 17,20;20,21-bismethylenedioxy-5,10-seco-5,19-cyclo-10β-fluoro-Δ⁴-pregnene-3,11 - dione may also be used as starting materials, with the bismethylenedioxy group being finally hydrolyzed by known methods, such as for example by refluxing with 60% formic acid. The hydroxy group at the 21-position can be esterified in the conventional manner, e.g., with acid anhydrides or acid chlorides containing less than 12 carbon atoms in pyridine solution.

In this manner there are obtained, for example, 5,10-seco-5,19-cyclo-10β-fluoro-Δ¹,⁴-pregnadien-17α,21-diol - 3, 20-dione; 5,10-seco-5,19-cyclo-10β-fluoro - Δ¹,⁴ - pregnadiene-17α,21-diol-3,11,20-trione; 5,10-seco-5,19-cyclo - 10β-fluoro-Δ¹,⁴-pregnadiene-11β,17α,21-triol-3,20-dione; 5,10-seco-5,19-cyclo-10β-fluoro-Δ⁴,⁶-pregnadiene-17α,21-diol -3, 20-dione; 5,10-seco-5,19-cyclo-10β-fluoro-Δ¹,⁴,⁶-pregnatriene-17α,21-diol-3,20-dione and the corresponding 11-keto and 11β-hydroxy derivatives of the Δ⁴,⁶-and Δ¹,⁴,⁶-compounds; 5,10-seco-5,19-cyclo-10β-fluoro-Δ³,⁵-pregnadiene-17α,21-diol-3,20-dione; 5,10-seco-5,19-cyclo - 10β - fluoro-Δ³,⁵-pregnadiene-17α,21-diol-3,11,20-trione, 5,10-seco - 5, 19-cyclo-10β-fluoro-Δ³,⁵-pregnadiene-11β,17α,21 - triol - 3, 20-dione and the corresponding 21-esters.

The 5,10-seco-5,19-cyclo-10β-fluoro-17α-hydroxy-pregnanes as well as the 11-oxygenated derivatives are obtained from the 5,10-seco-5,19-cyclo-10β-fluoro-17α,21-dihydroxy compounds by elimination of the 21-hydroxy group by known methods, for example by formation of the 21-tosylate and elimination of the tosiloxy group by treatment at reflux temperature with sodium iodide in acetic acid, thus producing, for example, 5,10-seco-5,19-cyclo-10β-fluoro-Δ⁴-pregnen-17α-ol-3,20-dione. 5,10-seco-5,19-cyclo-10β-fluoro-Δ¹,⁴-pregnadien-17α-ol-3,20 - dione, 5,10-seco-5,19-cyclo-10β-fluoro-Δ⁴,⁶-pregnadien-17α-ol - 3, 20-dione, 5,10-seco-5,19-cyclo-10β-fluoro-Δ¹,⁴,⁶ - pregnatrien-17α-ol-3,20-dione, and 5,10-seco-5,19-cyclo-10β-fluoro-Δ³,⁵-pregnadien-17α-ol-21-one, as well as the corresponding 11-keto and 11β-hydroxy derivatives.

The 17α-hydroxyl group may be esterified by reaction with carboxylic acid anhydrides of the type previously mentioned, in benzene solution, in the presence of p-toluenesulfonic acid.

The following examples serve to illustrate the present invention but are not intended to restrict the scope thereof.

Example I

A mixture of 1 g. of 5,10-seco-5,19-cyclo-10β-fluoro-Δ⁴-androsten-17β-ol-3-one, 50 cc. of t-butanol, 0.4 g. of recently sublimed selenium dioxide and 0.2 cc. of pyridine was refluxed under an atmosphere of nitrogen for 8 hours, cooled, filtered through celite and the filtrate evaporated to dryness under reduced pressure. By chromatography of the residue on neutral alumina, there was obtained 5,10-seco-5,19-cyclo-10β-fluoro - Δ¹,⁴ - androstadien - 17β-ol-3-one.

By the same method, the compounds mentioned below (I) were converted into the corresponding Δ¹-dehydro derivatives (II).

I 5,10-seco-5,19-cyclo-10β-fluoro-17α-methyl-Δ⁴-androsten-17β-ol-3-one
5,10-seco-5,19-cyclo-10β-fluoro-17α-vinyl-Δ⁴-androsten-17β-ol-3-one
5,10-seco,5,19-cyclo-10β-fluoro-17α-ethinyl-Δ⁴-androsten-17β-ol-3-one

II 5,10-seco-5,19-cyclo-10β-fluoro-17α-methyl-Δ¹,⁴-androstadien-17β-ol-3-one
5,10,-seco,5,19-cyclo-10β-fluoro-17α-vinyl-Δ¹,⁴-androstadien-17β-ol-3-one
5,10-seco-5,19-cyclo-10β-fluoro-17α-ethinyl-Δ¹,⁴-androstadien-17β-ol-3-one

Example II

A solution of 3 g. of 5,10-seco-5,19-cyclo-10β-fluoro-Δ⁴-androstene-3,17-dione in 150 cc. of tetrahydrofuran was added over a 30 minute period to a stirred suspension of 3 g. of lithium aluminum hydride in 150 cc. of anhydrous tetrahydrofuran. The mixture was refluxed for 2 hours, cooled and carefully treated with 10 cc. of ethyl acetate and 5 cc. of water. Solid sodium sulfate was then added, the inorganic material filtered off and washed several times with hot ethyl acetate; upon evaporation of the combined organic solution there was obtained a crude product which was purified by crystallization from acetone-hexane, thus giving 5,10-seco-5,19-cyclo-10β-fluoro-Δ⁴-androstene-3β,17β-diol.

1 g. of the preceding compound was dissolved in 25 cc. of 50% acetic acid and the resulting solution was heated on the steam bath for 4 hours. It was then diluted with water and the formed precipitate collected by filtration, washed to neutral and recrystallized from acetone-ether. There was thus obtained 5,10-seco-5,19-cyclo-10β-fluoro-Δ³,⁵-androstadien-17β-ol.

Example III

A mixture of 1 g. of 5,10-seco-5,19-cyclo-10β-fluoro-Δ⁴-androsten-17β-ol-3-one, 20 cc. of dioxane and 700 mg. of 2,3-dichloro-5,6 - dicyano - 1,4 - benzoquinone was refluxed for 10 hours. The reaction mixture was cooled, the 2,3-dichloro - 5,6 - dicyano - 1,4 - benzohydroquinone formed during the reaction was filtered off, and the filtrate evaporated to dryness. The residue was dissolved in acetone and filtered through 10 g. of alumina. Crystallization from acetone-hexane afforded 5,10-seco - 5,19-cyclo-10β-fluoro-Δ¹,⁴-androstadien-17β-ol-3-one, identical to that obtained in Example I.

A mixture of 500 mg. of the preceding compound, 1 g. of chloranil and 30 cc. of t-butanol was heated at reflux temperature for 8 hours. The mixture was cooled, the excess of chloranil filtered off and washed with ethyl acetate and the organic extracts washed with a cold 10% aqueous sodium hydroxide solution until the washings were colorless, and then with water to neutral, dried over anhydrous sodium sulfate and evaporated to dryness. Crystallization from methylene chloride-ether, after decolorization with alumina, gave 5,10-seco-5,19-cyclo-10β-fluoro-Δ¹,⁴,⁶-androstatrien-17β-ol-3-one.

Example IV

Example II was repeated but using as starting materials
5,10-seco-5,19-cyclo-10β-fluoro-17α-methyl-Δ⁴-androsten-17β-ol-3-one,
5,10-seco-5,19-cyclo-10β-fluoro-17α-vinyl-Δ⁴-androsten-17β-ol-3-one and
5,10-seco-5,19-cyclo-10β-fluoro-17α-ethinyl-Δ⁴-androsten-17β-ol-3-one, to produce as final products:
5,10-seco-5,19-cyclo-10β-fluoro-17α-methyl-Δ³,⁵-androstadien-17β-ol,
5,10-seco-5,19-cyclo-10β-fluoro-17α-vinyl-Δ³,⁵-androstadien-17β-ol and
5,10-seco-5,19-cyclo-10β-fluoro-17α-ethinyl-Δ³,⁵-androstadien-17β-ol.

Example V

By following the method described in Example III, 1 g. of 5,10-seco-5,19-cyclo-10β-fluoro-17α-methyl-Δ⁴ - androsten-17β-ol-3-one was refluxed for 8 hours with chloranil in t-butanol, to produce 5,10-seco-5,19-cyclo-10β-fluoro-17α-methyl-Δ$^{4,6}$-androstadien-17β-ol-3-one. The foregoing compound was then dehydrogenated with selenium dioxide, by following the method of Example I, to produce 5,10-seco-5,19-cyclo-10β-fluoro-17α-methyl-Δ$^{1,4,6}$-androstatrien-17β-ol-3-one.

In a similar manner, starting from
5,10-seco-5,19-cyclo-10β-fluoro-Δ$^4$-androsten-17β-ol-3-one,
5,10-seco-5,19-cyclo-10β-fluoro-17α-vinyl-Δ$^4$-androsten-17β-ol-3-one and
5,10-seco-5,19-cyclo-10β-fluoro-17α-ethinyl-Δ$^4$-androsten-17β-ol-3-one there were obtained respectively:
5,10-seco-5,19-cyclo-10β-fluoro-Δ$^{4,6}$-androstadien-17β-ol-3-one,
5,10-seco-5,19-cyclo-10β-fluoro-17α-vinyl-Δ$^{4,6}$-androstadien-17β-ol-3-one and
5,10-seco-5,19-cyclo-10β-fluoro-17α-ethinyl-Δ$^{4,6}$-androstadien-17β-ol-3-one as well as the corresponding Δ$^1$-dehydro compounds.

*Example VI*

A mixture of 5 g. of 5,10-seco-5,19-cyclo-10β-fluoro-Δ$^{1,4}$-androstadien-17β-ol-3-one, 4 cc. of pyridine and 4 cc. of acetic anhydride was kept at room temperature overnight, poured into ice-water and the formed precipitate collected by filtration, washed with water, and dried. By crystallization from acetone-hexane there was obtained by the acetate of 5,10-seco-5,19-cyclo-10β-fluoro-Δ$^{1,4}$-androstadien-17β-ol-3-one.

In the same manner, 5,10-seco-5,19-cyclo-10β-fluoro-Δ$^{1,4,6}$-androstatrien-17β-ol-3-one, 5,10-seco-5,19-cyclo-10β-fluoro-Δ$^{4,6}$-androstadien-17β-ol-3-one and, 5,10-seco-5,19-cyclo-10β-fluoro-Δ$^{3,5}$-androstadien-17β-ol, were converted into the corresponding acetates.

*Example VII*

In accordance with the method described in Example II, 2.5 g. of 5,10-seco-5,19-cyclo-10β-fluoro-Δ$^4$-pregnene-3,20-dione were reduced with lithium aluminum hydride to produce 5,10-seco-5,19-cyclo-10β-fluoro-Δ$^4$-pregnene-3β,20β-diol.

By treatment of the foregoing compound with 50% solution of glacial acetic acid, there was obtained 5,10-seco-5,19-cyclo-10β-fluoro-Δ$^{3,5}$-pregnadien-20-β-ol.

A solution of 0.5 g. of the preceding compound in 10 cc. of acetone was cooled to 0° C. and treated under nitrogen atmosphere with stirring with an 8 N solution of chromic acid (prepared by mixing 26 g. of chromium trioxide with 23 cc. of concentrated sulfuric acid and dilution with water to 100 cc.), until the color of the reagent persisted in the mixture. It was stirred for 5 minutes further at 0–5° C. and diluted with water. The precipitate was filtered, washed with water and dried under vacuum. By crystallization from acetone-hexane there was obtained 5,10-seco-5,19-cyclo-10β-fluoro-Δ$^{3,5}$-pregnadien-20-one.

*Example VIII*

By following the methods described in Example III, 1 g. of 5,10-seco-5,19-cyclo-10β-fluoro-Δ$^4$-pregnene-3,20-dione was converted successively into 5,10-seco-5,19-cyclo-10β-fluoro-Δ$^{1,4}$-pregnadiene-3,20-dione and 5,10-seco-5,19-cyclo-10β-fluoro-Δ$^{1,4,6}$-pregnatriene-3,20-dione.

*Example IX*

In accordance with the method described in Example I, 2 g. of 17,20;20,21-bismethylenedioxy-5,10-seco-5,19-cyclo-10β-fluoro-Δ$^4$-pregnene-3,11-dione was dehydrogenated with selenium dioxide in t-butanol solution, to produce 17,20;20,21-bismethylenedioxy-5,10-seco-5,19-cyclo-10β-fluoro-Δ$^{1,4}$-pregnadiene-3,11-dione.

A mixture of 1 g. of the preceding compound and 20 cc. of 60% formic acid was heated on the steam bath for 1 hour, cooled, poured into water and the formed precipitate collected by filtration. By crystallization from ethanol-ether there was obtained 5,10-seco-5,19-cyclo - 10β - fluoro-Δ$^{1,4}$-pregnadiene-17α,21-diol-3,11,20-trione.

*Example X*

The preceding example was repeated, but using as starting material 17,20;20,21 - bismethylenedioxy - 5,10 - seco-5,19-cyclo-10β-fluoro-Δ$^4$-pregnen - 3 - one to produce as final product 5,10-seco-5,19-cyclo-10β-fluoro-Δ$^{1,4}$ - pregnadiene-17α,21-diol-3,20-dione.

*Example XI*

In accordance with the method described in Example III, 500 mg. of 17,20;20,21-bismethylenedioxy-5,10-seco-5,19 - cyclo-10β-fluoro-Δ$^{1,4}$-pregnadiene-3,11-dione intermediate in Example IX were dehydrogenated with chloranil and the resulting Δ$^{1,4,6}$-pregnatriene-hydrolyzed with 60% formic acid, thus producing 5,10-seco-5,19-cyclo-10β - fluoro-Δ$^{1,4,6}$-pregnatriene-17α,21-diol-3,11,20-trione.

*Example XIII*

In accordance with the method described in Example II, 1 g. of the 17,20;20,21-bismethylenedioxy-5,10-seco-5,19-cyclo-10β-fluoro-Δ$^4$-pregnene - 3,11 - dione was reduced with lithium aluminum hydride to give 17,20;20,21-bismethylenedioxy - 5,10 - seco-5,10-seco-5,19-cyclo-10β-fluoro-Δ$^4$-pregnene-3β,11β-diol.

The preceding compound was heated with 50% acetic acid, 1 hour on the steam bath. Upon hydrolysis of the bismethylenedioxy group with 60% formic acid, by following the method described in Example IX there was obtained 5,10 - seco - 5,19 - cyclo - 10β-fluoro-Δ$^{3,5}$-pregnadiene-11β,17α,21-triol-20-one.

In a similar manner, starting from 17,20;20,21-bismethylenedioxy - 5,10 - seco - 5,19 - cyclo - 10β-fluoro-Δ$^4$-pregnen-3-one, there were obtained 17,20;20,21-bismethylenedioxy - 5,10 - seco-5,19-cyclo-10β-fluoro-Δ$^4$-pregnen-3β-ol- and 5,10 - seco-5,19-cyclo-10β-fluoro-Δ$^{3,5}$-pregnadiene-17α,21-diol-20-one.

*Example XIII*

A mixture of 1 g. of 17,20;20,21-bismethylenedioxy-5,10-seco-5,19-cyclo-10β-fluoro-Δ$^4$-pregnene-3β,11β - diol, 20 cc. of dioxane and 1.1 molar equivalent of 2,3-dichloro-5,6-dicyano-1,4-benzoquinone was stirred at room temperature for 3 hours. The hydroquinone formed during the reaction was filtered off and the filtrate evaporated to dryness. The residue was dissolved in acetone and filtered through 20 g. of alumina. By crystallization from acetone-hexane there was obtained 17,20;20,21-bismethylenedioxy-5,10-seco-5,19-cyclo - 10β - fluoro-Δ$^4$-pregnen - 11β - ol - 3 - one. Upon hydrolysis of the bismethylenedioxy group with 60% formic acid, by following the method described in Example IX, there was obtained 5,10-seco-5,19 - cyclo - 10β - fluoro-Δ$^4$ - pregnene-11β,17α,21-triol-3,20-dione.

Conventional esterification of this compound with acetic anhydride in pyridine, 1 hour on the steam bath, produced the corresponding 21-acetate, which in turn was dehydrogenated with selenium dioxide in t-butanol solution, in accordance with the method described in Example I, to produce the 21-acetate of 5,10 - seco - 5,19-cyclo - 10β-fluoro-Δ$^{1,4}$-pregnadiene-11β,17α,21-triol-3,20-dione.

A solution of 1 g. of the preceding compound in 50 cc. of methanol was treated with 2 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure.

The residue was triturated with water and the solid collected, washed with water, dried and recrystallized from ethyl acetate-methanol thus producing 5,10-seco-5,19-cyclo-10β-fluoro-Δ¹,⁴-pregnadiene - 11β,17α,21 - triol-3,20-dione.

Example XIV

By following the method of Example III, 1 g. of 17,20;20,21-bismethylenedioxy - 5,10-seco-5,19-cyclo-10β-fluoro-Δ⁴-pregnene-3,11-dione was treated with chloranil, to produce 17,20;20,21-bismethylenedioxy-5-10-seco-5,19-fluoro-Δ⁴,⁶-pregnadiene-17α,21-diol-3,11,20-trione.

The foregoing compound was then hydrolyzed with 60% formic acid, thus affording 5,10-seco-5,19-cyclo-10β-fluoro-Δ⁴,⁶-pregnadiene-17a,21-diol-3,11,20-trione.

In a similar manner, starting from 17,20;20,21-bis-methylenedioxy-5,10-seco-5,19-cyclo-10β-fluoro-Δ⁴ - pregnen-3-one there was obtained as final product 5,10-seco-5,19-cyclo-10β-fluoro-Δ⁴,⁶-pregnadiene - 17α,21-diol-3,20-dione.

Example XV

In accordance with the method described in Example VI, the compounds mentioned below under I were treated with the indicated acid anhydride, to produce the respective 17 or 21-monoesters (II).

| I | Anhydride | II |
|---|---|---|
| 5,10-seco-5,19-cyclo-10β-fluoro-Δ⁴,⁶-androstadien-17β-ol-3-one. | Caproic | Caproate of 5,10-seco-5,19-cyclo-10β-fluoro-Δ⁴,⁶-androstadien-17β-ol-3-one. |
| 5,10-seco-5,19-cyclo-10β-fluoro-Δ¹,⁴-androstadien-17β-ol-3-one. | Propionic | Propionate of 5,10-seco-5,19-cyclo-10β-fluoro-Δ¹,⁴-androstadien-17β-ol-3-one. |
| 5,10-seco-5,19-cyclo-10β-fluoro-Δ³,⁵-androstadien-17β-ol. | Enanthic | Enanthate of 5,19-seco-5,10-cyclo-10β-fluoro-Δ³,⁵-androstadien-17β-ol. |
| 5,10-seco-5,19-cyclo-10β-fluoro-Δ¹,⁴,⁶-androstatrien-17β-ol-3-one. | Propionic | Propionate of 5,10-seco-5,19-cyclo-10β-fluoro-Δ¹,⁴,⁶-androstatrien-17β-ol-3-one. |
| 5,10-seco-5,19-cyclo-10β-fluoro-Δ¹,⁴,⁶-androstatrien-17β-ol-3-one. | Cyclopentyl-propionic. | Cyclopentylpropionate of 5,10-seco-5,19-cyclo-10β-fluoro-Δ¹,⁴,⁶-androstatrien-17β-ol-3-one. |
| 5,10-seco-5,19-cyclo-10β-fluoro-Δ¹,⁴-androstadien-17β-ol-3-one. | Cyclopentyl-propionic. | Cyclopentylpropionate of 5,10-seco-5,19-cyclo-10β-fluoro-Δ¹,⁴-androstadien-17β-ol-3-one. |
| 5,10-seco-5,19-cyclo-10β-fluoro-Δ¹,⁴-pregnadiene-17α,21-diol-3,11,20-trione. | Propionic | 21-propionate of 5,10-seco-5,19-cyclo-10β-fluoro-Δ¹,⁴-pregnadiene-17α,21-diol-3,11,20-trione. |
| 5,10-seco-5,19-cyclo-10β-fluoro-Δ¹,⁴-pregnadiene-17α,21-diol-3,11,20-trione. | Caproic | 21-caproate of 5,10-seco-5,19-cyclo-10β-fluoro-Δ¹,⁴-pregnadiene-17α,21-diol-3,11,20-trione. |
| 5,10-seco-5,19-cyclo-10β-fluoro-Δ¹,⁴,⁶-pregnatrien-17α,21-diol-3,11,20-trione. | Cyclopentyl-propionic. | 21-cyclopentylpropionate of 5,10-seco-5,19-cyclo-10β-fluoro-Δ¹,⁴,⁶-pregnatriene-17α-21-diol-3,11,20-trione. |
| 5,10-seco-5,19-cyclo-10β-fluoro-Δ¹,⁴-pregnadiene-17α,21-diol-3,20-dione. | Acetic | 21-acetate of 5,10-seco-5,19-cyclo-10β-fluoro-Δ¹,⁴-pregnadiene-17α,21-diol-3,20-dione. |
| 5,10-seco-5,19-cyclo-10β-fluoro-Δ³,⁵-pregnadiene-11β,17α,21-triol-20-one. | Propionic | 21-propionate of 5,10-seco-5,19-cyclo-10β-fluoro-Δ³,⁵-pregnadiene-11β,17α,21-triol-20-one. |
| 5,10-seco-5,19-cyclo-10β-fluoro-Δ⁴,⁶-pregnadiene-17α,21-diol-3,11,20-trione. | Acetic | 21-acetate of 5,10-seco-5,19-cyclo-10β-fluoro-Δ⁴,⁶-pregnadiene-17α,21-diol-3,11,20-trione. |

Example XVI 500 mg. of 17,20;20,21-bismethylenedioxy-5,10-seco-5,19-cyclo-10β-fluoro-Δ³,⁵-pregnadien-11β-ol intermediate of Example XII were oxidized with an 8 N solution of chromic acid in acetone in accordance with the method described in Example VII, and the 11-keto compound obtained was hydrolized with 60% formic acid, thus producing 5,10-seco-5,19-cyclo-10β-fluoro-Δ³,⁵-pregnadiene-17α, 21-diol-11,20-dione.

Example XVII

To a cooled solution of 1 g. of 5,10-seco-5,19-cyclo-10β-fluoro-Δ¹,⁴-pregnadiene-17α,21-diol-3,20-dione in 5 cc. of pyridine there were added 500 mg. of tosyl chloride and the mixture was kept overnight at 0° C. It was then diluted with water and the formed precipitate filtered and dried under vacuum, to produce the 21-tosylate of 5,10-seco - 5,19 - cyclo - 10β - fluoro - Δ¹,⁴ - pregnadiene - 17α, 21-diol-3,20-dione which was used for the next step without further purification.

A solution of 1 g. of the foregoing crude compound in 40 cc. of glacial acetic acid was treated with 3 g. of sodium iodide and the mixture refluxed for 2 hours, poured into ice-water and extracted several times with methylene chloride; the extracts were combined, washed successively with aqueous sodium carbonate solution, sodium sulfite solution and water, dried, and evaporated under reduced pressure by crystallization of the residue from acetone-hexane; there was obtained 5,10-seco-5,19-cyclo-10β-fluoro-Δ¹,⁴-pregnadien-17α-ol-3,20-dione.

In similar manner the compounds mentioned below (I) were converted into the corresponding 21-desoxy derivatives (II).

| I | II |
|---|---|
| 5,10-seco-5,19-cyclo-10β-fluoro-Δ¹,³-pregnadiene-17α,21-diol-3,11,20-trione. | 5,10-seco-5,19-cyclo-10β-fluoro-Δ¹,⁴-pregnadien-17α-ol-3,11,20-trione. |
| 5,10-seco-5,19-cyclo-10β-fluoro-Δ¹,⁴,⁶-pregnatriene-17α,21-diol-3,11,20-trione. | 5,10-seco-5,19-cyclo-10β-fluoro-Δ¹,⁴,⁶-pregnatrien-17α-ol-3,11,20-trione. |
| 5,10-seco-5,19-cyclo-10β-fluoro-Δ¹,⁴-pregnadiene-11β,17α,21-triol-3,20-dione. | 5,10-seco-5,19-cyclo-10β-fluoro-Δ¹,⁴-pregnadiene-11β,17α-diol-3,20-dione. |
| 5,10-seco-5,19-cyclo-10β-fluoro-Δ³,⁵-pregnadiene-11β,17α,21-triol-20-one. | 5,10-seco-5,19-cyclo-10β-fluoro-Δ³,⁵-pregnadiene-11β,17α-diol-20-one. |
| 5,10-seco-5,19-cyclo-10β-fluoro-Δ³,⁵-pregnadiene-17α,21-diol-11,20-dione. | 5,10-seco-5,19-cyclo-10β-fluoro-Δ³,⁵-pregnadien-17α-ol-11,20-dione. |
| 5,10-seco-5,19-cyclo-10β-fluoro-Δ³,⁵-pregnadiene-17α,21-diol-20-one. | 5,10-seco-5,19-cyclo-10β-fluoro-Δ³,⁵-pregnadien-17α-ol-20-one. |
| 5,10-seco-5,19-cyclo-10β-fluoro-Δ¹,⁴,⁶-pregnatriene-17α,21-diol-3,20-dione. | 5,10-seco-5,19-cyclo-10β-fluoro-Δ¹,⁴,⁶-pregnatrien-17α-ol-3,20-dione. |
| 5,10-seco-5,19-cyclo-10β-fluoro-Δ⁴,⁶-pregnadiene-17α,21-diol-3,11,20-trione. | 5,10-seco-5,19-cyclo-10β-fluoro-Δ⁴,⁶-pregnadien-17α-ol-3,11,20-trione. |

Example XVIII

To a solution of 250 mg. of 5,10-seco-5,19-cyclo-10β-fluoro-Δ¹,⁴-pregnadien-17α-ol-3,20-dione in 15 cc. of benzene were added 2 cc. of acetic anhydride and 0.1 g. of p-toluenesulfonic acid.

The mixture was kept at room temperature overnight, poured into water and stirred for 30 minutes to hydrolyzed the excess of agent, the benzene layer was separated and washed with 5% sodium carbonate solution and water to neutral dried over anhydrous sodium sulfate and evaporated to dryness. The residue was crystallized from acetone-hexane to produce the acetate of 5,10-seco-5,19-cyclo-10β-fluoro-Δ¹,⁴-pregnadien-17α-ol-3,20-dione.

By the same method, 5,10-seco-5,19-cyclo-10β-fluoro-Δ¹,⁴,⁶-pregnatrien-17α-ol-3,20-dione, 5,10-seco-5,19-cyclo-10β-fluoro-Δ³,⁵-pregnadien-17α-ol-20-one, 5,10-seco-5,19,-cyclo-10β-fluoro-Δ¹,⁴-pregnadien-17α - ol - 3,11,20 - trione were converted into respective acetates.

Example XIX

In accordance with the method described in the preceding example the compounds mentioned below under I were esterified with the indicated acid anhydrides to produce the respective esters (II):

| I | Anhydride | II |
|---|---|---|
| 5,10-seco-5,19-cyclo-10β-fluoro-Δ³,⁵-pregnadien-17α-ol-11,20-dione. | Caproic | Caproate of 5,10-seco-5,19-cyclo-10β-fluoro-Δ³,⁵-pregnadien-17α-ol-11,20-dione. |
| 5,10-seco-5,19-cyclo-10β-fluoro-Δ³,⁵-pregnadien-17α-ol-20-one. | Propionic | Propionate of 5,10-seco-5,19-cyclo-10β-fluoro-Δ³,⁵-pregnadien-17α-ol-20-one. |
| 5,10-seco-5,19-cyclo-10β-fluoro-Δ¹,⁴,⁶-pregnatrien-17α-ol-3,20-dione. | Enanthic | Enanthate of 5,10-seco-5,19-cyclo-10β-fluoro-Δ¹,⁴,⁶-pregnatrien-17α-ol-3,20-dione. |
| 5,10-seco-5,19-cyclo-10β-fluoro-Δ¹,⁴-pregnadien-17α-ol-3,20-dione. | Cyclopentylpropionic. | Cyclopentylpropionate of 5,10-seco-5,19-cyclo-10β-fluoro-Δ¹,⁴-pregnadien-17α-ol-3,20-dione. |
| 5,10-seco-5,19-cyclo-10β-fluoro-Δ¹,⁴-pregnadien-17α-ol-3,20-dione. | Caproic | Caproate of 5,10-seco-5,19-cyclo-10β-fluoro-Δ¹,⁴-pregnadien-17α-ol-3,20-dione. |
| 5,10-seco-5,19-cyclo-10β-fluoro-Δ¹,⁴-pregnadien-17α-ol-3,11,20-trione. | Propionic | Propionate of 5,10-seco-5,19-cyclo-10β-fluoro-Δ¹,⁴-pregnadien-17α-ol-3,11,20-trione. |
| 5,10-seco-5,19-cyclo-10β-fluoro-Δ¹,⁴,⁶-pregnatrien-17α-ol-3,11,20-trione. | Undecenoic | Undecenoate of 5,10-seco-5,19-cyclo-10β-fluoro-Δ¹,⁴,⁶-pregnatrien-17α-ol-3,11,20-trione. |
| 5,10-seco-5,19-cyclo-10β-fluoro-17α-methyl-Δ¹,⁴-pregnadien-17β-ol-3-one. | Acetic | Acetate of 5,10-seco-5,19-cyclo-10β-fluoro-17α-methyl-Δ¹,⁴-pregnadien-17β-ol-3-one. |
| 5,10-seco-5,19-cyclo-10β-fluoro-17α-methyl-Δ³,⁵-androstadien-17β-ol. | Cyclopentylpropionic. | Cyclopentylpropionate of 5,10-seco-5,19-cyclo-10β-fluoro-17α-methyl-Δ³,⁵-androstadien-17β-ol. |
| 5,10-seco-5,19-cyclo-10β-fluoro-17α-methyl-Δ¹,⁴,⁶-androstatrien-17β-ol-3-one. | Propionic | Propionate of 5,10-seco-5,19-cyclo-10β-fluoro-17α-methyl-Δ¹,⁴,⁶-androstatrien-17β-ol-3-one. |
| 5,10-seco-5,19-cyclo-10β-fluoro-17α-vinyl-Δ¹,⁴-androstadien-17β-ol-3-one. | Caproic | Caproate of 5,10-seco-5,19-cyclo-10β-fluoro-17α-vinyl-Δ¹,⁴-androstadien-17β-ol-3-one. |
| 5,10-seco-5,19-cyclo-10β-fluoro-17α-ethinyl-Δ¹,⁴,⁶-androstatrien-17β-ol-3-one. | Acetic | Acetate of 5,10-seco-5,19-cyclo-10β-fluoro-17α-ethinyl-Δ¹,⁴,⁶-androstatrien-17β-ol-3-one. |
| 5,10-seco-5,19-cyclo-10β-fluoro-17α-ethinyl-Δ³,⁵-androstadien-17β-ol. | Propionic | Propionate of 5,10-seco-5,19-cyclo-10β-fluoro-17α-ethinyl-Δ³,⁵-androstadien-17β-ol. |

6. 17α - methyl - 5,10 - seco - 5,19 - cyclo - 10β - fluoro-Δ³,⁵-androstadien-17β-ol.

I claim:
1. A compound of the following formula:

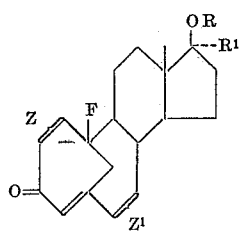

wherein R is selected from the group consisting of hydrogen and a hydrocarbon carboxylic acid radial of less than 12 carbon atoms; $R^1$ is selected from the group consisting of hydrogen, lower alkyl, lower alkenyl and lower alkinyl; Z is selected from the group consisting of a single and a double bond between C–1 and C–2 and $Z^1$ is selected from the group consisting of a single and a double bond between C–6 and C–7 with at least one of Z and $Z^1$ being a double bond.

2. 5,10 - seco - 5,19 - cyclo - 10β - fluoro - $\Delta^{1,4}$ - androstadien-17β-ol-3-one.

3. 5,10 - seco - 5,19 - cyclo - 10β - fluoro - $\Delta^{1,4,6}$-androstatrien-17β-ol-3-one.

4. A compound of the following formula:

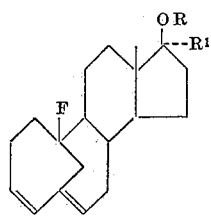

wherein R is selected from the group consisting of hydrogen and a hydrocarbon carboxylic acid radical of less than 12 carbon atoms; and $R^1$ is selected from the group consisting of hydrogen, lower alkyl, lower alkenyl and lower alkinyl.

5. 5,10 - seco - 5,19 - cyclo - 10β - fluoro - $\Delta^{3,5}$ - androstadien-17β-ol.

7. A compound of the following formula:

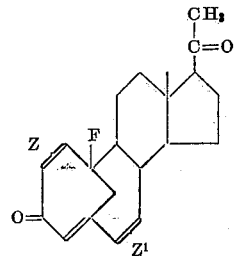

wherein Z is selected from the group consisting of a single and a double bond between C–1 and C–2; and $Z^1$ is selected from the group consisting of a single and a double bond between C–6 and C–7 with at least one of Z and $Z^1$ being a double bond.

8. 5,10 - seco - 5,19 - cyclo - 10β - fluoro - $\Delta^{1,4}$ - pregnadiene-3,20-dione.

9. 5,10 - seco - 5,19 - cyclo - 10β - fluoro - $\Delta^{1,4,6}$ - pregnatriene-3,20-dione.

10. 5,10 - seco - 5,19 - cyclo - 10β - fluoro - $\Delta^{3,5}$ - pregnadien-20-one.

11. A compound of the following formula:

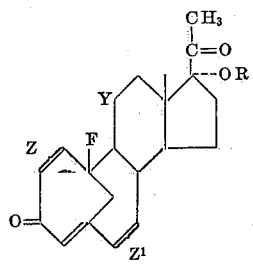

wherein R is selected from the group consisting of hydrogen and a hydrocarbon carboxylic acid radical of less than 12 carbon atoms; Z is selected from the group consisting of a single and a double bond between C–1 and C–2; $Z^1$ is selected from the group consisting of a single and a double bond between C–6 and C–7; and Y is selected from the group consisting of hydrogen, β-hydroxy and keto with at least one of Z and $Z^1$ being a double bond.

12. 5,10 - seco - 5,19 - cyclo - 10β - fluoro - Δ$^{1,4}$ - pregnadien-17α-ol-3,20-dione.

13. 5,10 - seco - 5,19 - cyclo - 10β - fluoro - Δ$^{1,4}$ - pregnadiene-11β,17α-diol-3,20-dione.

14. A compound of the following formula:

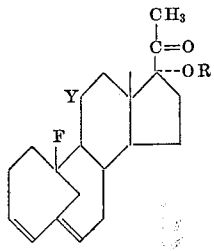

wherein R is selected from the group consisting of hydrogen and a hydrocarbon carboxylic acid radical of less than 12 carbon atoms; and Y is selected from the group consisting of hydrogen, β-hydroxy and keto.

15. 5,10 - seco - 5,19 - cyclo - 10β - fluoro - Δ$^{3,5}$ - pregnadien-17α-ol-20-one.

16. 5,10 - seco - 5,19 - cyclo - 10β - fluoro - Δ$^{3,5}$ - pregnadiene-11β,17α-diol-20-one.

17. A compound of the following formula:

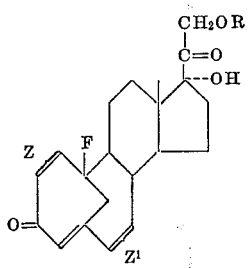

wherein R is selected from the group consisting of hydrogen and a hydrocarbon carboxylic acid radical of less than 12 carbon atoms; Z is selected from the group consisting of a single and a double bond between C-1 and C-2, $Z^1$ is selected from the group consisting of a single and a double bond between C-6 and C-7; and Y is selected from the group consisting of hydrogen, β-hydroxy and keto when at least one of Z and $Z^1$ is a double bond.

18. 5,10 - seco - 5,19 - cyclo - 10β - fluoro - Δ$^{1,4}$ - pregnadiene-17α,21-diol-3,11,20-trione.

19. 5,10 - seco - 5,19 - cyclo - 10β - fluoro - Δ$^{1,4}$ - pregnadiene-11β,17α,21-triol-3,20-dione.

20. 5,10 - seco - 5,19 - cyclo - 10β - fluoro - Δ$^{1,4,6}$ - pregnatriene-17α,21-diol-3,11,20-trione.

21. A compound of the following formula:

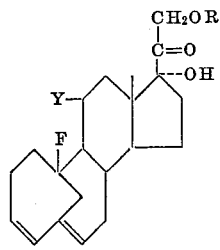

wherein R is selected from the group consisting of hydrogen and a hydrocarbon carboxylic acid radical of less than 12 carbon atoms; and Y is selected from the group consisting of hydrogen, β-hydroxy and keto.

22. 5,10 - seco - 5,19 - cyclo - 10β - fluoro - Δ$^{3,5}$-pregnadiene-17α,21-diol-20-one.

23. 5,10 - seco - 5,19 - cyclo - 10β - fluoro - Δ$^{3,5}$-pregnadiene-11β,17α,21-triol-20-one.

24. 5,10 - seco - 5,19 - cyclo - 10β - fluoro - Δ$^{3,5}$-pregnadiene-17α,21-diol-11,20-dione.

References Cited by the Examiner

UNITED STATES PATENTS 3,184,484    5/1965    Knox            260—586 X

LEON ZITVER, *Primary Examiner.*

M. M. JACOB, *Assistant Examiner.*